US012765558B2

(12) United States Patent
Escobar Valdés et al.

(10) Patent No.: US 12,765,558 B2
(45) Date of Patent: Oct. 20, 2026

(54) BIOLOGICAL INSECTICIDE FORMULATION, FREE OF CHEMICAL PRODUCTS, FOR INSECT PEST CONTROL IN PLANTS

(71) Applicant: BIO INSUMOS NATIVA SPA, Talca (CL)

(72) Inventors: Paulo Andrés Escobar Valdés, Talca (CL); Eduardo Patricio Donoso Cuevas, Talca (CL); Gustavo Adolfo Lobos Prats, Talca (CL)

(73) Assignee: BIO INSUMOS NATIVA SPA, Talca (CL)

( * ) Notice: Subject to any disclaimer, the term of this patent is extended or adjusted under 35 U.S.C. 154(b) by 312 days.

(21) Appl. No.: 18/576,206

(22) PCT Filed: Sep. 24, 2021

(86) PCT No.: PCT/CL2021/050090

§ 371 (c)(1),
(2) Date: Jan. 3, 2024

(87) PCT Pub. No.: WO2023/279216

PCT Pub. Date: Jan. 12, 2023

(65) Prior Publication Data

US 2024/0206476 A1 Jun. 27, 2024

(30) Foreign Application Priority Data

Jul. 7, 2021 (CL) .................................. 1811-2021

(51) Int. Cl.

| | |
|---|---|
| ***A01N 63/22*** | (2020.01) |
| ***A01N 25/04*** | (2006.01) |
| ***A01N 25/14*** | (2006.01) |
| ***A01P 7/04*** | (2006.01) |

(52) U.S. Cl.
CPC ............ *A01N 63/22* (2020.01); *A01N 25/04* (2013.01); *A01N 25/14* (2013.01); *A01P 7/04* (2021.08)

(58) Field of Classification Search
None
See application file for complete search history.

(56) References Cited

U.S. PATENT DOCUMENTS

| | | | |
|---|---|---|---|
| 6,015,553 | A | 1/2000 | Germida |
| 8,586,027 | B2 | 11/2013 | Escobar Valdes |

FOREIGN PATENT DOCUMENTS

| | | |
|---|---|---|
| WO | 2012153327 | 11/2012 |
| WO | 2019157608 | 8/2019 |

OTHER PUBLICATIONS

Dhouha Ghribi; Mouna Elleuch; Lobna Abdelkefi; Semia Ellouze-Chaabouni;, "Evaluation of larvicidal potency ofSPB1 biosurfactant against(Lepidoptera: Pyralidae) larvae and influence of abiotic factors on its insecticidal activity", Journal of Stored Products Research., Pergamon Press, Oxford., GB, GB , (Oct. 7, 2011), vol. 48, doi:10.1016/j.jspr.2011.10.002, ISSN 0022-474X, pp. 68-72, XP028454500.

Halder Jaydeep, Kushwaha Deepak, Rai Awadhesh Bahadur, Singh Arpita, "Potential of entomopathogens and neem oil against two emerging insect pests of vegetables", Indian Journal of Agricultural Sciences, (Feb. 1, 2017), vol. 87, No. 2, pp. 220-224, XP093022968.

*Primary Examiner* — Brian Gangle
(74) *Attorney, Agent, or Firm* — FisherBroyles, LLP; Jason P. Mueller

(57) ABSTRACT

Chemical-free, biological insecticide formulation for the control of insect pests in plants, wherein said formulation comprises *Bacillus subtilis* strain No. 5 NRRL 50391, at defined concentrations, palatability enhancers or attractants, a carrier selected from clays, kaolin, tale, zeolite, water, vegetable oils, paraffinic or non-paraffinic minerals among other agents.

6 Claims, No Drawings

BIOLOGICAL INSECTICIDE FORMULATION, FREE OF CHEMICAL PRODUCTS, FOR INSECT PEST CONTROL IN PLANTS

CROSS REFERENCE

This application is a national stage entry application under 35 U.S.C. 371 of PCT Patent Application No. PCT/CL2021/050090, filed Sep. 24, 2021, the entire contents of which are incorporated herein by reference.

The invention relates to an insecticidal formulation with broad spectrum insecticidal action, for the control of insect pests, such as those described in Table 1, among others where a microorganism, *Bacillus subtilis* strain No. 5 NRRL 50391, is used. Preferably, the microorganism, *Bacillus subtilis* strain No. 5 NRRL 50391, is comprised in a composition, which in addition to the strain, is formulated together with palatability enhancers or attractants, endospore dispersion enhancers, selected from the group consisting of polyamide, sorbitol, ammonium oxalate, sodium hexametaphosphate, among others. In a preferred mode said spore dispersion enhancers are in defined ranges, such as, for example, polyamide in a range of 0.01 to 1.5%, preferably 0.5%; sorbitol 0.1 to 1.5% preferably 0.5%; ammonium oxalate 0.1 to 1.5% preferably 0.5%; sodium hexametaphosphate 0.1 to 2%, preferably 0.5%. As attractants (palatability enhancers), a protein source, and a carbohydrate source are included; wherein the protein source is selected from the group consisting of peptone, legume meal, for example bean meal, soybean meal, lupine meal, pea meal; and wherein the carbohydrate source is selected from potato starch, corn starch, rye starch, among others. In a preferred embodiment, the formulation further comprises diatomaceous earth, whereby the exposure of insect epithelium to the endospores is increased, thus enhancing the insecticidal effect of the composition.

Below, in Table 1, the order and species of insects that are susceptible to be controlled with the insecticidal composition of the invention are described.

TABLE 1

| | |
|---|---|
| *Diptera* | *Anastrepha* sp, *Liriomyza* sp., *Liriomyza trifolli*, *Drosophila suzukii*, *Drosophila melanogaster* |
| *Lepidoptera* | *Proeulia auraria*, *Proeulia chrysopteris*, *Proeulia triquetra*, *Cydia pomonella*, *Cydia molesta*, *Ectomyelois ceratoniae*, *Orgya antiqua*, *Otiorhychus rugostratus*, *Copitarsia consueta*, *Heliothis virescens*, *Tuta absoluta*, *Plutella xylostella*, *Pieris brassicae*, *Copitarsia consueta*, *Trichoplusia* sp., *Rachiplusia* sp., *Heliothis zea*, *Spodoptera frugiperda*, *Helicoverpa armigera*, *Daiphnia* sp., *Lobesia botrana*, *Anticarsia gemmatalis*, *Heliothis* sp., *Rachiplusia un*, *Phthorimaea operculella*, *Plutella xylostella*, *Edwardsiana crataegui*, *Spodoptera frugiperda*, *Premnotrypes vorax*, *Sagalassa valida*, *Spodoptera frugiperda*, *Lyriomiza* sp., *Prodiplosis longifila*, *Colias sp.*, *Autographa* sp., *Eoreuma loftini*, *Diatraea saccharalis*, *Dalaca pallens*, *Dalaca variabilis* |
| *Coleoptera* | *Cosmopolites sordidus*, *Colaspis submetallica*, *Asynonychus cervinus*, *Hylamorpha elegans*, *Sericoides* sp., *S. viridis*, *S. obesa*, *Brachysternus prasinus*, *B. spectabilis*, *Phytholaema herrmanni*, *P. dilutipes*, *Tomarus villosus*, *Aegorhinus superciliosus*, *Aegorhinus nodipennis*, *Aegorhinus phaleratus*, *Otiorhynchus sulcatus*, *Otiorhynchus rugosostriatus*, *Naupactus xanthographus*, *Graphognatus leucoloma*, *Naupactus cervinus* |
| *Hemiptera* | *Diaspis* sp., *Dysmiccocus brevipes*, *Diaspidiotus perniciosus*, *Pseudococcus viburni*, *Myzus persicae*, *Pseudococcus longispinus*, *Eriosoma lanigerum*, *Chromaphis juglandicola*, *Leptoglossus chilensis*, *Myzocallis coryl*, *Frankliniela birbicauda*, *Bemisia osfat*, *Aspidiotus destructor*, *Aleurothrixus floccosus*, *Macrosiphum* sp, *Assayeurodes vaporariorum*, *Bemisia tabaci*, *Assayeurodes*, *Oebalus* spp., *Leptopharsa gibbicarina*, *Diatraea saccharalis*, *Bemisia argentifolli*, *Brevicoryne brassicae*, *Planoccocus Citri*, *Planoccocus Ficus*, *Pseudococcus viburni*, *Pseudococcus longispinus*, *Phenacoccus peruvianus*, *Aphis Illinoisensis*, *Brachycaudus persicae*, *Aphisspiraecola* sp., *Brachycaudus schwartzi*, *Toxoptera aurantii*, *Aphis citricola*, *Aphis craccivora*, *Aphis gossypii*, *Aphis spiraecola*, *Aleurothrixus floccosus*, *Saissetia oleae*, *Aspidiotus nerii*, *Ceroplastes cirripediformis*, *Saissetia coffee*, *Icerya purchasi*, *Aspidiotus nerii*, *Hemiberlesia rapax*, *Aleurothrixus floccosus*, *Aphis fabae*, *Macrosiphum solanifolii*, *Aphis craccivora*, *Brevicoryne brassicae*, *Aphis gossypii*, *Macrosiphum* spp. *Aphis gossypii*, *Leptoglossus chilensis* |
| *Tysanoptera* | *Chaetanaphothrips signipennis*, *Frankliniella parvula*, *Frankliniela birbicauda*, *Frankliniella occidentalis*, *Scirtothrips citri*, *Caliothrips phaseoli*, *Thrips tabaci*, *Thrips* sp., *y Frankliniella* sp., *Tagosodes oryzicola*, *Frankliniella bruneri*, *Heliothrips haemorrhoidalis*, *Scirtothrips perseae*, *Scirtothrips aguacatae*, *Scirtothrips kupandae*, *Pseudophilothrips perseae*, *y Frankliniella australis* |
| *Acari* | *Tetranychus urticae*, *Brevipalpus chilensis*, *Colomerus vitis*, *Calepitrimerus vitis*, *Oligonychus vitis*, *Oligonychus yothersi*, *Aleurothrixus floccosus*, *Panonychus citri*, *Bryobia rubrioculus*, *Panonychus ulmi*, *Assayeurodes vaporariorum*, |

The formulations of the invention can be found in the form of a suspension for wettable powder, an oily dispersion, bait and gel, for use both on crops and seed coating and urban pest control. The following may be used in such formulations as carriers, without excluding others: clays, kaolin, talc, zeolite, water, vegetable oils, paraffinic or non-paraffinic minerals, among other carrier agents.

The formulation of the invention allows the control of pests, without the need to use conventional insecticides, and due to the characteristics of its components, it does not present environmental restrictions and can be used in organic production or other certification system.

BACKGROUND OF THE INVENTION

As regards the state of the art, we can cite patent ES 2 057 638, which refers to an insecticide composition comprising a biomass of *Bacillus thuringiensis* (selected among *Bacillus thuringiensis* var. Donegani, *Bacillus thuringiensis* var. Kurstaki, *Bacillus thuringiensis* var. San diego and *Bacillus thuringiensis* var. Tenebrionis), or only its toxin, and one or more phospholipids (selected from phosphatidylcholine, phosphatidylethanolamine, phosphatidylinositol, phosphatidylglycerol and their hydrogenated, hydroxylated and ethoxylated derivatives), or a substance with a high phospholipid content; and further containing at least one anionic surfactant chosen from fatty acid esters (C10-C20) with optionally ethoxylated glycerol or sorbitol; wherein the weight ratio of the biomass of *Bacillus thuringiensis* or its toxin to said surfactants is within the range of 1:0,2 a 1:5.

DESCRIPTION OF THE INVENTION

The present invention is intended to provide a biological insecticide formulation, intended for the control of pests in cultivated agricultural and forestry, ornamental, domestic and wild plants, those described in Table 1 among other pests.

The formulation comprises the bacterium *Bacillus subtilis* strain No. 5 NRRL 50391, or the formulation further comprises spores of the bacterium *Bacillus subtilis* strain No. 5 NRRL 50391.

The entomopathogenic bacteria (BEP) and its possible formulations allow the control of pests without the need to use conventional insecticides and due to its characteristics does not present environmental restrictions and can be used in production, conventional, organic or other certification system.

The composition of the invention is characterized in that it comprises the strain, *Bacillus subtilis* strain No. 5 NRRL 50391, together with other components, such as carriers, which are selected from the group formed by clays, kaolin, talc, zeolite, water, vegetable oils, paraffinic or non-paraffinic minerals among other agents. The formulation of the invention comprises *Bacillus subtilis* strain No. 5 NRRL 50391, at concentrations in the range of $10^6$ to $10^{10}$ spores/g; preferably from $10^7$ to $10^{10}$ spores/g.

The formulation of the invention is in the form of a suspension capsule for seed treatment, bait in any of its forms; combi pack in any of its forms, concentrates; emulsifiable; concentrated suspension, encapsulated, miscible formulation, ultra-low volume formulation; tablets in any of its forms; ultra-low volume tablets; oil-in-water emulsions, water-in-oil emulsions, concentrated gel or paste, emulsifiable gel, seed treatment gel; dispersible, encapsulated, fine, soluble, emulsifiable granules; macro granules, micro granules; paste; contact powders, wettable, dispersible; seed treatment solution, concentrated suspension, not excluding others.

DETAILED DESCRIPTION OF THE INVENTION

Experimental Assays with the Formulation of the Invention

The following experimental assays provide results of the efficacy of the formulation of the invention against various insect pests.

In an example of the invention, an oily dispersion formulation was generated, where in vegetable oil (80% v/v), Polyamide (4% v/v), Sorbitol (1% v/v), Ammonium Oxalate (2% v/v) and Sodium Hexametaphosphate (3%) were added as emulsifiers and dispersion improvers of the spores of *Bacillus subtilis* strain N° 5 NRRL 50391 at a concentration of $3\times10^8$ spores/ml are added with 5% w/v peptone and 5% w/v starch, in order to increase palatability and generate an attraction effect on pests.

In a second example, a wettable powder formulation is generated, using 80% w/w zeolite as carrier, sorbitol (5% w/v) as dispersion improver, 5% peptone w/w and 5% starch w/w, in order to increase palatability and generate an attraction effect on pests and 5% diatomaceous earth to increase the penetration of the epithelium by the spores 5% w/w.

The formulations used in the assays are defined in the following Table 2, based on their components contained in the final formulation.

TABLE 2

| | Formulation | | | |
|---|---|---|---|---|
| Component | 1 | 2 | 3 | 4 |
| *Bacillus subtilis* strain No 5 NRRL 50391 | $3.0 \times 10^8$ spores/ml | $3.0 \times 10^8$ spores/g | $3.0 \times 10^8$ spores/g | $3.0 \times 10^8$ spores/g |
| Polyamide | 4% | | | |
| Sorbitol | 1% | 5% | 5% | 5% |
| Ammonium oxalate | 2% | | | |
| Sodium Hexametaphosphate | 3% | | | |
| Peptone | 5% | 5% | 5% | |
| Potato starch | 5% | 5% | 5% | |
| Diatomaceous earth | | | 5% | |
| Zeolite | | 85% | 80% | 95% |
| Vegetal oil | 80% | | | |

Evaluation of the Efficacy of Entomopathogenic Bacteria in the Control of Grapevine Leafhoppers (*Pseudococcus viburni*) Under Laboratory Conditions.

In order to evaluate the effectiveness of entomopathogenic bacteria in the control of grapevine leafhoppers (*Pseudococcus viburni*), a laboratory assay was carried out using lemon tree fruits previously infested with *Pseudococcus viburni*. The methodological specifications of the assay are shown in Table 3.

The commercial product Confidor Forte 200 SL, which includes Imidacloprid, was used in the evaluation for comparison.

TABLE 3

| Application methodology and treatments evaluated. | | |
|---|---|---|
| BACKGROUND OF THE APPLICATION | | |
| Target plague | Grapevine leafhoppers (*Pseudococcus viburni*) | |
| Application unit | Micro-sprayer | |
| Output by minute/ | 20.0 cc | |
| Output by fruit | 1.6 cc | |
| Application date | Sep. 23, 2020 | |
| Working pressure | 5 bars | |
| Temperature | 20° C. | |
| Relative humidity | 60% | |
| TREATMENTS | | |
| Product | Active ingredient | Concentration (g or cc/L) |
| 13 different assay formulations. | *Bacillus subtilis* cepa N5 NRRL 50391 y/o *Bacillus cereus* cepa N6 | 5.0 |
| Confidor Forte 200 SL | Imidacloprid | 1.0 |
| Control | — | — |

Statistical design. The assay was carried out with a completely randomized design, with fifteen treatments and six replicates, each consisting of one lemon tree fruit. The results were subjected to an Analysis of Covariance and a Tukey test of separation of means, p≤0.05.

Application procedure. The core sample unit used was a lemon tree fruit previously infested with the pest. The application was carried out by means of a micro-sprayer equipment. The fruit was placed on a rotating base and then the nozzle trigger was pressed for 5 seconds (duration of the complete rotation of the platform) allowing a homogeneous application on the fruit.

The percentage of effectiveness was calculated according to the following formula:

$$\%\ \text{Effectiveness corrected} = \frac{(Co\ \text{population before treatment} * n\ \text{at}\ T\ \text{after treatment}) * 100}{(\text{Population in}\ Co\ \text{after treatment} * n\ \text{at}\ T\ \text{before treatment}).}$$

where:

n=insect population,

T=treated,

Co=Control

Strain N5=*Bacillus subtilis* strain N° 5 NRRL 50391

Strain N6=*Bacillus cereus* strain N6 NRRL B 50392, strain belonging to the applicant's collection of microorganisms.

TABLE 4

Description of the 13 formulations used in the treatments designed to measure the percentage of control efficacy at 13 days post-application.

| Treatments | Formulation |
|---|---|
| 1) N5 WP | From a pure culture of *Bacillus subtilis* strain N5 NRRL 50391, with 80% sporulation, 5 liters were extracted and dried in sterile zeolite to a concentration of $3.0 \times 10^8$ spores/g, which were dried at 80° C. for 12 hours. |
| 2) N6 WP | From a pure culture of *Bacillus cereus* strain N6 NRRL B 50392, with 80% sporulation, 5 liters were extracted and dried in sterile zeolite to a concentration of $1.0 \times 10^8$ spores/g, which were dried at 80° C. for 12 hours. |
| 3) N5 + N6 WP | From the above formulations, a physical mixture of both strains (*Bacillus subtilis* strain N5 NRRL 50391 + *Bacillus cereus* strain N6 NRRL 50392) was made in a 1:1 ratio of each strain, until a total concentration of $1.0 \times 10^8$ spores/gr was obtained. |
| 4) N5 WP + starch | From a pure culture of *Bacillus subtilis* strain N5 NRRL 50391, with 80% sporulation, 5 liters were extracted and dried in sterile zeolite + starch (5% w/w) to a concentration of $3.0 \times 10^8$ spores/g, which were dried at 80° C. for 12 hours. |
| 5) N5 WP + peptone | From a pure culture of *Bacillus subtilis* strain N5 NRRL 50391, with 80% sporulation, 5 liters were extracted and dried in sterile zeolite + peptone (5% w/w) to a concentration of $3.0 \times 10^8$ spores/g, which were dried at 80° C. for 12 hours. |
| 6) N5 WP + sacarose + peptone | From a pure culture of *Bacillus subtilis* strain N5 NRRL 50391, with 80% sporulation, 5 liters were extracted and dried in sterile zeolite + starch (5% w/w), peptone (5% w/w) to a concentration of $3.0 \times 10^8$ spores/g, which were dried at 80° C. for 12 hours. |
| 7) N6 WP + starch | From a pure culture of *Bacillus cereus* strain N6 NRRL B 50392, with 80% sporulation, 5 liters were extracted and dried in sterile zeolite + starch (5% w/w) to a concentration of $3.0 \times 10^8$ spores/g, which were dried at 80° C. for 12 hours. |
| 8) N6 WP + peptone | From a pure culture of *Bacillus cereus* strain N6 NRRL B 50392, with 80% sporulation, 5 liters were extracted and dried in sterile zeolite + starch (5% w/w) to a concentration of $3.0 \times 10^8$ spores/g, which were dried at 80° C. for 12 hours. |
| 9) N6 WP + starch + peptone | From a pure culture of *Bacillus cereus* strain N6 NRRL B 50392, with 80% sporulation, 5 liters were extracted and dried in sterile zeolite + starch (5% w/w) to a concentration of $3.0 \times 10^8$ spores/g, which were dried at 80° C. for 12 hours. |

TABLE 4-continued

| Description of the 13 formulations used in the treatments designed to measure the percentage of control efficacy at 13 days post-application. | |
|---|---|
| Treatments | Formulation |
| 10) N6 od | From a pure culture of *Bacillus cereus* strain N6 NRRL 50392, with 80% sporulation, 5 liters were extracted and mixed with vegetal oil (45 liters) to a concentration of 3.0 × $10^8$ spores/g, which were dried at 80° C. for 12 hours. |
| 11) N5 od | From a pure culture of *Bacillus subtilis* strain N5 NRRL 50391, with 80% sporulation, 5 liters were extracted and mixed with vegetal oil (45 liters) to a concentration of 3.0 × $10^8$ spores/g, which were dried at 80° C. for 12 hours. |
| 12) N5 Od + starch | From a pure culture of *Bacillus subtilis* strain N5 NRRL 50391, with 80% sporulation, 5 liters were extracted supplemented with starch and mixed with vegetal oil (45 liters) to a concentration of 3.0 × $10^8$ spores/g, which were dried at 80° C. for 12 hours. |
| 13) N6 OD + starch | From a pure culture of *Bacillus cereus* strain N6 NRRL 50392, with 80% sporulation, 5 liters were extracted supplemented with starch and mixed with vegetal oil (45 liters) to a concentration of 3.0 × $10^8$ spores/g, which were dried at 80° C. for 12 hours. |
| Confidor Forte 200 SL | Imidacloprid 20% (v/w) ia. Bayer |
| Control | Sterile water |

Evaluation: To determine the effectiveness of the different treatments described in Table 4, two evaluations were carried out: prior to application and 13 days after application. In each evaluation, the abundance of adults and live nymphs of the grapevine leafhoppers was recorded using a stereoscopic magnifying glass.

Table 5 shows the results of the measurement of the control efficacy of entomopathogenic bacteria on the abundance of total grapevine leafhoppers. Quillota, 2016.

TABLE 5

| Results of the efficacy of treatments with entomopathogenic bacteria on the control of *Pseudococcus viburnum* in laboratory conditions. | |
|---|---|
| Treatments | % control efficacy (Henderson and Tilton formula). 13 days after application |
| N5 WP | 58.0 c |
| N6 WP | 8.3 e |
| N5 + N6 WP | 12.6 e |
| N5 WP + starch | 59.5 c |
| N5 WP + peptone | 36.1 de |
| N5 WP + starch + peptone | 56.2 c |
| N6 WP + starch | 39.4 d |
| N6 WP + peptone | 46.1 d |
| N6 WP + starch + peptone | 30.3 de |
| N6 od | 11.7 e |
| N5 od | 21.6 e |
| N5 Od + starch | 67.2 bc |
| N6 OD + starch | 38.0 de |
| Confidor Forte 200 SL | 78.1 a |
| Control | 0.0 e |

Different letters (a-e) in treatments indicate statistically significant differences in multiple comparisons with Tukey's test within the same experimental conditions ($P < 0.05$).

Conclusions:

The strains that presented higher control efficacy of grapevine leafhopper *P. viburni*, according to the calculation with the Henderson and Tilton formula, were:

N5 WP (58.0%)

N5 WP+peptone (59.5%)

N5 WP+starch+peptone (56.2%)

N5 OD+starch (67.2%).

These treatments are different from the control.

Determination of the Control Activity of Formulations Containing Entomopathogenic Bacteria on Pests of Agricultural Interest.

This assay seeks to establish the effect delivered by various formulations of entomopathogenic bacteria, named as ES102M4 (27/01/21); BBA120 (27/01/21); NTD102 (27/01/21) and NBP 102 (27/01/21) against *Pseudococcus viburni*.

Methodology (Adapted from IRAC Methodologies No. 001 and 019)

Materials

- 200 Petri dishes (9 cm diameter) per assay
- Plastic bags
- Absorbent cotton
- Plastic boxes
- Potato sprouts, untreated with insecticides
- Vine leaves (insecticide-free)
- Small tweezers
- Fine-tipped paintbrush or cocktail stick
- Glass beakers or flasks (approx. 100 ml capacity)
- For test liquids 1 ml disposable plastic syringes for liquids and jewelry-type weighing scales (microgram accuracy) for solids
- Binocular microscope 80×-400×
- Thermometer Methodology Samples of different stages of grapevine leafhoppers were collected by collecting infested fruit from different plants at random in an untreated orchard. This material was initially transported and preserved in plastic boxes, taking care that they were not crushed or rolled inside. At least 20 adult specimens were destined to traditional taxonomy, following the guidelines of González R. H. *Pseudocóccidos de importancia fruticola en Chile* (*Hemiptera:Pseudococcidae*). (2011), Universidad de Chile, Publications in Ciencias Agrícolas No. 18. p 186. p 186.

Once the pest species was confirmed, 100 third instar nymphs were transferred to potato shoots (using a hairbrush), where they were kept isolated until neonate nymphs of the F1 generation were obtained.

Once the neonate nymphs were obtained, some non-infested leaves of similar size and color (also untreated)

were collected and used for controlled infestation of 5 nymphs per leaf, with 5 replicates for each dose evaluated.

Test dilutions of the different formulations were prepared in water, in 5 tentative increasing concentrations (treatments) (starting at the equivalent of 100 cc-g/1001; and gradually decreasing in 10 cc-g/1001, until an adequate adjustment of significance of the mortality curve was obtained. The pH of the dilutions was controlled and maintained between 6.9 and 7.2 (neutral). Each dose was replicated 4 times (repetitions); considering an independent assay for each formulation: ES102M4 (01/27/21); BBA120 (01/27/21); NTD102 (01/27/21) and NBP 102 (01/27/21). Test liquids were shaken, and then non-infested leaves were dipped for 5 seconds, five leaves per treatment, including a core sample (water only). The insects were transferred to the leaves once the reservoir was dry, with the aid of a small single hairbrush.

A small piece of wet absorbent cotton was placed around the petiole of each leaf to avoid dehydration. Petri dishes were stored in rearing chamber under light:dark control 12:12 hours; averaging 22±0.5° C. and 30% RH.

Using a binocular microscope, mortality was assessed after 3-24-48 and 72 h by testing the ability of each white piglet to show coordinated movement in response to a single hairbrush touch. Once the time required for insecticidal action was established, the assay was replicated by evaluating only at that interval (24 h). In parallel, surviving nymphs exposed to the formulations at less than the lethal dose were retained on new potato shoots (untreated) in order to quantify the average number of nymphs obtained per female during F2.

The results were expressed as percentage mortality (without the use of correction formulas), estimating the dose-response curve with probit analysis in order to estimate the $LC_{50}$ and $LC_{90}$ of each formulation. Female fecundity was also quantified according to exposure dose (sublethal dose).

The description of the formulations used in the control of grapevine leafhoppers pests (*Pseudococcus viburni*) achieved with the formulations of the invention comprising entomopathogenic bacteria is shown in Table 6.

TABLE 6

Details of the formulations evaluated for the control delivered with entomopathogenic bacteria on pests of agricultural interest (*Pseudococcus viburni*).

| Treatments | Formulation |
|---|---|
| ES102M4 Formulation 1 | From a pure culture of *Bacillus subtilus* strain N5 NRRL 50391, with 80% sporulation, 5 liters were extracted supplemented with starch (5% v/w) and peptone and mixed with vegetal oil (45 liters) to a concentration of 3.0 × $10^8$ spores/g, which were dried at 80° C. for 12 hours. |
| BBA120 Formulation 2 | From a pure culture of *Bacillus subtilus* strain N5 NRRL 50391, with 80% sporulation, 5 liters were extracted and dried in sterile zeolite + starch (5% v/w), peptone (5% v/w) to a concentration of 3.0 × $10^8$ spores/g, which were dried at 80° C. for 12 hours. |
| NTD102 Formulation 3 | From a pure culture of *Bacillus subtilus* strain N5 NRRL 50391, with 80% sporulation, 5 liters were extracted and dried in sterile zeolite, supplemented with starch (5% v/w), peptone (5% v/w) and diatomaceous earth (5% v/w) to a concentration of 3.0 × $10^8$ spores/g, which were dried at 80° C. for 12 hours. |
| NBP102 Formulation 4 | From a pure culture of *Bacillus subtilus* strain N5 NRRL 50391, with 80% sporulation, 5 liters were extracted and dried in sterile zeolite, to a concentration of 3.0 × $10^8$ spores/g, which were dried at 80° C. for 12 hours. |
| Control | Sterile water |

Results

With the use of the four formulations described in Table 6, it was possible to demonstrate the response associated with mortality of the grapevine leafhoppers populations exposed to the treatments. The effective dose (estimated as $LC_{90}$ or mg of formulated product per liter of solution) is summarized in Table 7 (for the formulated product), which is suggested for use in future field assays.

TABLE 7

Sensitivity results obtained with the different formulations (concentrations expressed in mg of formulated product/liter).

| Sample No | Reference | $CL_{50}$ | Standard deviation | $CL_{90}$ | P value |
|---|---|---|---|---|---|
| 1 | ES102M4 (27/01/21) | 10.13 | 1.07 | 29.81 | <0.001 |
| 2 | BBA120 (27/01/21) | 10.60 | 1.08 | 31.78 | <0.001 |
| 3 | NTD102 (27/01/21) | 10.34 | 1.07 | 29.75 | <0.001 |
| 4 | NBP 102 (27/01/21) | 13.56 | 1.13 | 57.26 | <0.001 |

Regarding female fecundity, when exposed to 10 ppm of the ES102M4 formulation (01/27/21), fecundity was observed to decrease from 250 nymphs to 170 viable nymphs (within one month of parturition, between Mar. 1 and Apr. 1, 2021).

For the formulations BBA120 (27/01/21); NTD102 (27/01/21); or NBP 102 (27/01/21), no significant variations in the evaluated ranges were detected.

The invention claimed is:

1. A biological formulation for the control of insect pests on plants, free from conventional insecticides wherein said formulation comprises:

*Bacillus subtilis* strain No. 5 NRRL 50391 at concentrations from 10 to $10^{12}$ spores/g, palatability enhancers or attractants selected from the group consisting of: (i) starch sources selected from the group consisting of: com starch, rice starch, and potato flour, and (ii) a protein source selected from the group consisting of: peptone, yeast extract, and fish oil, and a carrier selected from the group consisting of clays, kaolin, talc, zeolite, water, vegetable oils, paraffinic and non-paraffinic minerals.

2. The biological insecticide formulation, according to claim 1, wherein it further comprises diatomaceous earth.

3. The biological insecticide formulation according to claim 1, wherein in the formulation the starch sources are comprised in a percentage of 5 to 30% weight-by-weight (w/w) of the total formulation.

4. The biological insecticide formulation according to claim 1, wherein in the formulation the protein source is comprised in a percentage of 7 to 35% weight-by weight (w/w) of the total formulation.

5. The biological insecticide formulation, according to claim 1, wherein said formulation is in the form of one of, a suspension capsule for seed treatment,
bait
a combi pack,
a concentrated suspension,
tablets
oil-in-water,
water-in-oil emulsions for seed treatment;
concentrated gel or paste,
an emulsifiable gel,
gel for seed treatment,
dispersible granules
macro granules,
micro granules,
paste,
contact powders for seed treatment,
a solution for seed treatment, and
a concentrated suspension for seed treatment.

6. The biological insecticide formulation, according to claim 1, wherein the *Bacillus subtilis* strain No. 5 NRRL 50391 is at a concentration from $10^5$ to $10^{10}$ spores/g.

* * * * *